United States Patent [19]

Kemner et al.

[11] Patent Number: 5,103,219

[45] Date of Patent: Apr. 7, 1992

[54] PICTURE SIGNAL PROCESSING CIRCUIT FOR IMPROVING HIGH-FREQUENCY PICTURE RESOLUTION UPON PICTURE SIGNAL DISPLAY

[75] Inventors: Rudolf Kemner; Johannes J. Stouten, both of Eindhoven, Netherlands

[73] Assignee: U.S. Philips Corporation, New York, N.Y.

[21] Appl. No.: 414,808

[22] Filed: Sep. 29, 1989

[30] Foreign Application Priority Data

Oct. 4, 1988 [NL] Netherlands ............... 8802426

[51] Int. Cl.$^5$ .............................................. G09G 1/00
[52] U.S. Cl. .................................. 340/812; 340/814; 358/160
[58] Field of Search ............... 340/720, 723, 728, 732, 340/744, 745, 811, 812, 813, 814; 358/160, 168, 169, 162, 163, 166, 243

[56] References Cited

U.S. PATENT DOCUMENTS

| | | | |
|---|---|---|---|
| 3,980,819 | 9/1976 | Schwartz | 358/166 |
| 4,258,298 | 3/1981 | Hilburn et al. | 315/382 |
| 4,314,245 | 2/1982 | Wilbur, Jr. | 340/744 |
| 4,358,788 | 11/1982 | Burrows | 340/723 |
| 4,484,188 | 11/1984 | Ott | 340/723 |
| 4,559,558 | 12/1985 | Hosaya et al. | 358/162 |
| 4,573,081 | 2/1986 | Reeder | 358/162 |

*Primary Examiner*—Jeffery A. Brier
*Attorney, Agent, or Firm*—Michael E. Marion

[57] ABSTRACT

The circuit has an input terminal (1) for supplying a picture signal (CS) formed line and field-sequentially with line and field or frame periods (TV) and an output terminal (2) for supplying a processed picture signal (CS') to be applied to a picture display device (5) comprising a picture display tube operating by way of electron beam scanning (e) of a display screen (8). In the circuit the input terminal (1) is coupled to a filter circuit (10) which has a first output (11) and a second output (12) for supplying a low-frequency ($CS_L$) or high-frequency ($CS_H$) picture signal component, respectively. The first output (11) is coupled via an amplifier circuit (16) to a first input (21) of a time-division multiplex circuit (20) having a second input (22) to which the first output (11) and the second output (12) of the filter circuit (10) are coupled each via an amplifier circuit (17, 18) and an adder circuit (19). The time-division multiplex circuit (20) has a switching input (23) which is coupled to an output (29) of a switching signal generator (28) for supplying a periodical switching signal (VS) of the double field or frame period (2TV). An output (24) of the time-division multiplex circuit (20) is coupled to the output terminal (2) of the picture signal processing circuit. The resultant spatial time-division multiplex display yields the improved high-frequency picture resolution.

7 Claims, 1 Drawing Sheet

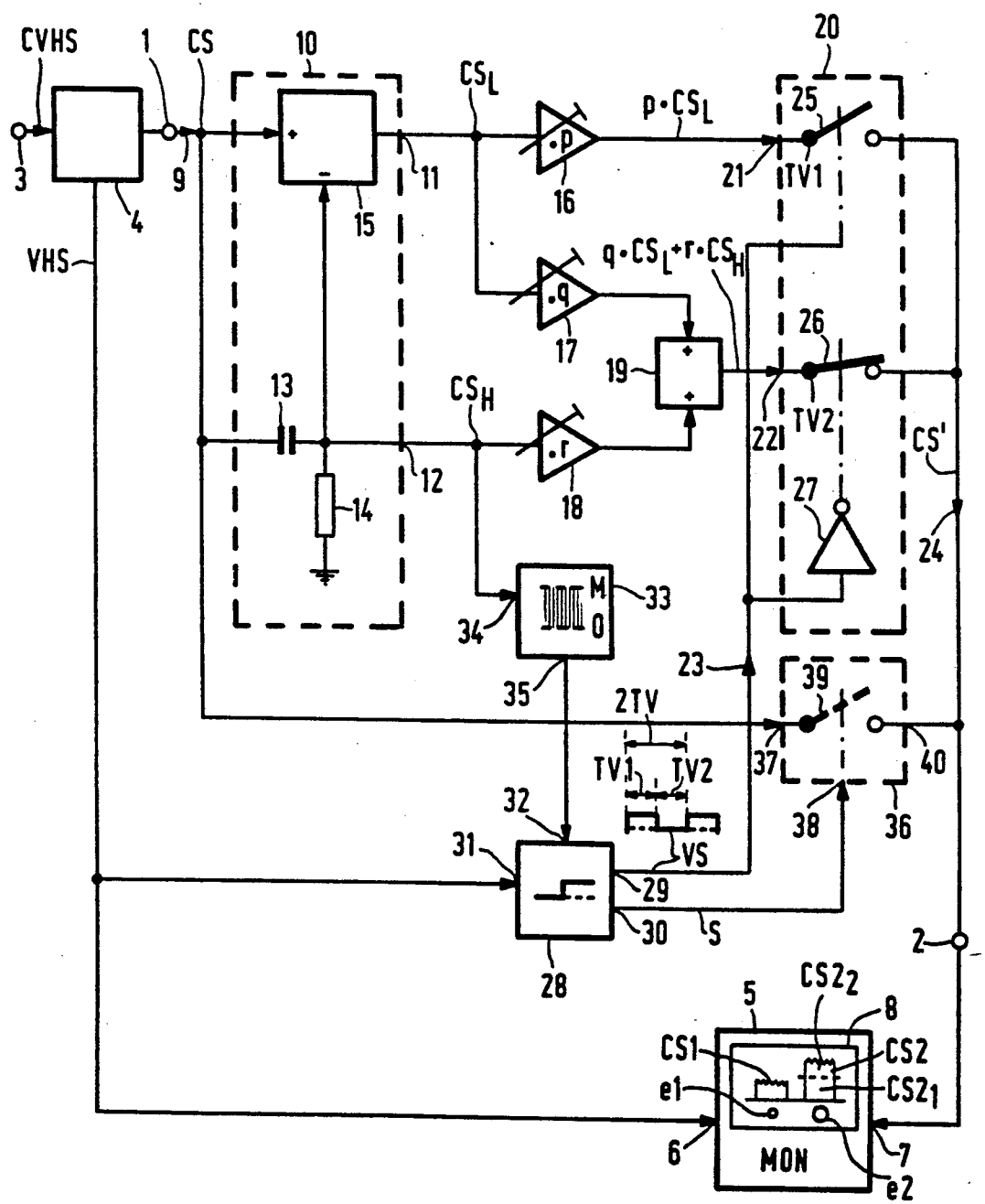

PICTURE SIGNAL PROCESSING CIRCUIT FOR IMPROVING HIGH-FREQUENCY PICTURE RESOLUTION UPON PICTURE SIGNAL DISPLAY

BACKGROUND OF THE INVENTION

The invention relates to a picture signal processing circuit for improving high-frequency picture resolution upon picture signal display, which circuit has an input terminal for supplying a picture signal formed line and field-sequentially with line and field or frame periods and an output terminal for supplying a processed picture signal to be applied to a picture display device comprising a picture display tube operating by way of electron beam scanning of a picture display screen.

Such a circuit for improving the high-frequency picture resolution is desired due to the use of electron beam scanning upon picture signal display. With electron beam scanning larger picture brightnesses and stronger contrasts are accompanied by an enlargement of the electron beam spot on the display screen. This leads to a deterioration of the high-frequency picture resolution.

SUMMARY OF THE INVENTION

The invention has for its object to realize a picture signal processing circuit leading to an optimum high-frequency picture resolution. To this end a circuit according to the invention is characterized in that the input terminal in the circuit is coupled to a filter circuit for the picture signal, which filter circuit has a first and a second output for supplying a low-frequency and a high-frequency picture signal component, respectively, the first output being coupled via an amplifier circuit to a first input of a time-division multiplex circuit having a second input to which the first and the second output of the filter circuit are coupled each via an amplifier circuit and an adder circuit, said time-division multiplex circuit having a switching input which is coupled to an output of a switching signal generator for supplying a periodical switching signal of the double field or frame period, an output of the time-division multiplex circuit being coupled to the output terminal of the picture signal processing circuit.

It is achieved by the circuit that low-frequency and high-frequency picture signal components are displayed in an alternating manner, separated in time, which can be designated as "spatial time-division multiplex". In this case a presupposition is made for the circuit, namely: no maximum modulation depth is present in the high-frequency picture signal component. In practice this presupposition holds true for substantially all picture signal sources, except for electronic test signal generators which can supply high-frequency picture signals at a modulation depth of 100%.

A circuit according to the invention, which operates in an optimum manner also if such a test picture signal is possibly supplied, is characterized in that the circuit comprises a circuit for measuring modulation depth, an input of said measuring circuit being coupled to the second output of the filter circuit for supplying the high-frequency picture signal component and an output being coupled to an input of the said generator, the time-division multiplex circuit being rendered inoperative when a maximum modulation depth is measured and a short-circuit switch arranged between input terminal and output terminal being rendered operative. The short-circuit between input terminal and output terminal leads to the then optimum possible picture resolution.

BRIEF DESCRIPTION OF THE DRAWING

The invention will be described in greater detail by way of example with reference to the accompanying drawing whose sole FIGURE shows a picture signal processing circuit according to the invention in a block-schematic diagram.

DETAILED DESCRIPTION OF AN EMBODIMENT OF THE INVENTION

In the FIGURE the reference numeral 1 denotes an input terminal and 2 denotes an output terminal of the picture signal processing circuit. The reference numeral 3 denotes an input terminal for supplying a video signal CVHS to be processed. The signal CVHS comprises a line and field-sequentially composed picture signal CS and a synchronizing signal VHS which comprises, for example line and field-synchronizing pulses, blanking pulses and equalizing pulses. The video signal CVHS may be fixed or not fixed in a television standard and upon display it may present a non-interlaced picture or a single or multiple interlaced picture. In the case of single interlacing there is a field period of, for example 20 s or 16.6833 s and a line period of 64 $\mu$s or 63.555 $\mu$s, respectively, the frame period being equal to the double field period. In the case of non-interlacing the frame period is identical to the field period and in the case of 20 ms a frame or field frequency of 50 Hz is associated therewith. To reduce flickering phenomena upon picture display, the field frequency or field period may be chosen to be equal to 100 Hz or 10 ms, respectively, in the case of interlacing or non-interlacing. The specific composition of the video signal CVHS is further disregarded. The line and field-sequentially composed picture signal CS is assumed to be originating from a picture signal source forming part of a television system in its widest sense. Examples are braodcast television, X-ray or infrared television, television for monitoring purposes, for displaying computer data etc. In this case there may be a display with moving or stationary pictures. Furthermore the picture signal CS may be a luminance, chrominance or colour difference signal in the case of colour television or a picture signal in the case of monochrome television.

In the Figure the reference numeral 4 denotes a signal separating circuit which operates inter alia as a signal separating circuit for supplying the picture signal CS and the field and line-synchronizing signal VHS when the video signal CVHS is supplied. Furthermore the signal separating circuit 4 may comprise signal correction circuits such as a de-gamma correction circuit. If the signal CVHS is a digital signal, the signal separating circuit 4 may comprise a D/A converter when the signal processing circuit with the input terminal 1 and the output terminal 2 is operative on an analog basis. If this circuit operates on a digital basis and if an analog signal CVHS is presented, the signal separating circuit 4 will comprise an A/D converter.

The Figure shows a picture display device denoted by the reference numeral 5, an input 6 of which is coupled to the signal separating circuit 4 for supplying the signal VHS. An input 7 is coupled to the output terminal 2 for supplying the processed picture signal which is denoted by CS'. The device 5 is shown with a display screen 8 in which two picture signals CS1 and CS2 are shown diagrammatically by way of example. The signal CS1 is shown with a small amplitude and it is displayed by means of an electron beam with a small beam spot e1 on the screen 8. The signal CS2 is shown with a larger amplitude and is associated with a larger electron beam spot e2. The electron beam e is generated by an electron gun (not shown) which is present in an electron display tube which forms part of the display device 5. The display screen 8 of the display tube is scanned by the electron beam e under the control of line and field deflection means such as, for example deflection coils. The diameter of the spot e1 or e2 is dependent on the instantaneous picture signal amplitude. In this case a larger amplitude is accompanied by a reduced picture resolution which is fixed by the spot size. The weaker picture signal CS1 has a higher picture resolution upon display than the stronger picture signal CS2. According to the invention the stronger picture signal CS2 will be displayed with an improved high-frequency picture resolution due to the formation of the picture signal CS'.

The input terminal 1 is coupled to an input 9 of a filter circuit 10 which has a first output 11 and a second output 12. The input 9 is coupled via a capacitor 13 to the output 12 which is further coupled to ground via a resistor 14. The capacitor 13 and the resistor 14 combined constitute a high-pass filter (13, 14) in its simplest form. The filter circuit 10 also comprises a subtractor circuit 15 having a (+) input which is coupled to the input 9 and a (−) input which is coupled to the output 12. An output of the circuit 15 is coupled to the filter output 11. In conjunction with the filter (13, 14) the circuit 15 operates as a low-pass filter (13, 14, 15). The embodiment shown means that the filter circuit 10 comprises complementary filters (13, 14) and (13, 14, 15). The result is that the picture signal CS is split into a low-frequency picture signal component $CS_L$ and a high-frequency picture signal component $CS_H$, which are complementary. Instead of the embodiment shown, two separate low-pass and high-pass filters could be used which are complementary or not complementary. Overlapping filter characteristics or separated, non-contiguous filter characteristics may be present in this case. In practice complementary filter characteristics for the high-frequency resolution improvement appear to be preferred.

The output 11 is coupled to an input of a first amplifier circuit 16 and a second amplifier circuit 17. The output 12 is coupled to an input of a third amplifier circuit 18. Outputs of the circuits 17 and 18 are coupled to (+) inputs of an adder circuit 19. The circuits 16, 17 and 18 are shown with adjustable gain factors denoted p, q and r, respectively. The factors p, q and r may be adjustable or dynamically adjustable, dependent on the picture signal contents. Fixed factors p, q and r determined by calculation could also be present. The adjustability is a possible option.

The reference numeral 20 in the Figure denotes a time-division multiplex circuit. A first input 21 and a second input 22 are coupled to an output of the circuits 16 and 19, respectively, which supply a signal $p.CS_L$ and $q.CS_L+r.CS_H$, respectively. The circuit 20 has a switching input 23 for applying a switching signal VS and an output 24 for supplying the processed picture signal CS'. The circuit 20 is shown with a first switch 25 and a second switch 26, the switching signal VS controlling the switch 25 directly and the switch 26 via an inverter circuit 27. Consequently, in the open or closed state of the switch 25, the switch 26 will be closed or open, respectively. For the sake of simplicity the switches 25 and 26 are shown as mechanical switches, but in practice they will be electronic switches. It appears that the processed picture signal CS' which is supplied from the output terminal 2 via the output 24 of the circuit 20 has undergone a time-division multiplex signal processing. To this end the signal VS to be supplied by a switching signal generator 28 is applied to the switching input 23. A first output 29 of the generator 28 supplies the switching signal VS, while a short-circuit signal S is available at a second output 30. The synchronizing signal VHS is applied to a first input 31 of the generator 28. The result is the supply of the switching signal VS shown. Two field or frame periods TV are denoted by TV1 and TV2 at the signal VS. The signal VS shows a periodical switching signal of the double field or frame period 2TV. The short-circuit signal S is supplied by the generator 28 when the switching signal VS is absent, more specifically while applying a signal to a second input 32 of the generator 28, which signal originates from a circuit 33 for measuring modulation depth.

The circuit 33 for measuring modulation depth has an input 34 which is coupled to the output 12 of the filter circuit 10 and to an output 35 to be coupled to the input 32 of the generator 28. In the circuit 33 the measurement of the modulation depth is illustrated by M and O. In case of a measurement of a high modulation depth in the high-frequency picture signal component $CS_H$ the generator 28 supplies the short-circuit signal S to be applied to a short-circuit switch 36. The switch 36 has an input 37 which is connected to the input terminal 1, while a short-circuit input 38 is coupled to the output 30. The switch 36 is shown with a switching member 39 which is controlled via the short-circuit input 38. An output 40 is connected to the output terminal 2. When measuring a given maximum modulation depth in the high-frequency picture signal component, the time-division multiplex circuit 20 is rendered inoperative, while the short-circuit switch 36 is rendered operative and the switching member 39 connects the input terminal 1 to the output terminal 2.

The block-schematic diagram of the Figure shows that, for example the picture signal component $p.CS_L$ during first periods TV1 and then the picture signal component $q.CS_L+r.CS_H$ during second periods TV2 are periodically applied for display to the device 5 with a period 2TV which is equal to the double field or frame period TV. For the picture signal CS2 shown this means that a picture signal component $CS2_1$ which is present under a broken line is displayed during the first periods TV1, while a component $CS2_2$ which is present above the broken line is displayed during the second periods TV2. In this case it holds that $CS2_1=p.CS_L$ and $CS2_2=q.CS_L+r.CS_H$. The component $CS2_1$ is displayed with the electron beam spot e2, while the component $CS2_2$ is displayed with the spot e1. Consequently, the low-frequency picture information is displayed with the low picture resolution, while the combined high and low-frequency picture information is displayed with a higher picture resolution. The "spatial time-division multiplex display" in which picture signal components are displayed in an alternating manner, separated in time, leads to an improved high-frequency picture resolution.

The picture resolution improvement is based on the presupposition that the high-frequency picture signal component $CS_H$ does not have a maximum modulation depth of 100%. In practice, this presupposition holds true for substantially all picture signal sources, except for electronic test signal generators as a picture signal source. If the picture signal component $CS_H$ has a high modulation depth and if this component is displayed with the larger electron beam spot e2, the picture appears to have a poorer quality in practice. For this purpose the short-circuit switch 36 is provided in the circuit according to the invention, because then the original picture resolution is the optimum possible picture resolution.

In the picture signal combination $CS2_2 = q.CS_L + r.CS_H$ the low-frequency component $CS_L$ is present as a pedestal for the high-frequency component $CS_H$. This pedestal is required to ensure that the total signal $CS2_2$ is always positive.

It appears that the spatial time-division multiplex display is effected with a period which is equal to the double field period TV. Starting from a period TV = 10 ms, the signal $CS2_1 = p.CS_L$ is displayed during a first 10 ms and the signal $CS2_2 = q.CS_L = r.CS_H$ is displayed during the second 10 ms. To realise more or less the same brightness in the case of spatial time-division multiplex display as compared with the known display, it must hold that p+q and r are approximately equal to two. In practice the following values of the gain factors appear to be satisfactory: p=1.2, q=0.8 and r=2; p=1.3, q=0.7 and r=2; p=1.2, q=0.8 and r=2.5. Other combinations are possible. In the last-mentioned combination with r=2.5 there is a further accentuation at the display of the higher frequencies in the picture signal.

In the case of colour television the picture signal CS is, for example a luminance signal, while associated chrominance or colour difference signals are directly applied in an unprocessed form to the display device 5.

In the case of projection television the display device 5 may comprise a projection display tube in which the picture on the screen 8 is projected on a projection screen via a system of lenses. In this case the two picture signal components could each be applied to a separate projection display tube, while a picture combination is formed on the projection screen via the system of lenses. A high picture brightness and resolution is the result upon display.

We Claim

1. A picture signal processing circuit for improving high-frequency picture resolution upon picture signal display, which circuit has an input terminal for supplying a picture signal formed line and field-sequentially with line and field or frame periods and an output terminal for supplying a processed picture signal to be applied to a picture display device comprising a picture display tube operating by way of electron beam scanning of a picture display screen, characterized in that the input terminal in the circuit is coupled to a filter circuit for the picture signal, which filter circuit has first and second outputs for supplying a low-frequency and a high-frequency picture signal components, respectively, the first output being coupled to a first input of a time-division multiplex circuit having a second input to which the first and the second outputs of the filter circuit are coupled, said time-division multiplex circuit having a switching input which is coupled to an output of a switching signal generator for supplying a periodical switching signal of the double field or frame period, an output of the time-division multiplex circuit being coupled to the output terminal of the picture signal processing circuit.

2. A picture signal processing circuit as claimed in claim 1, wherein the low and high-frequency picture signal components are complementary.

3. A picture signal processing circuit as claimed in claim 2 further comprising a circuit for measuring modulation depth, an input of said measuring circuit being coupled to the second output of the filter circuit for supplying the high-frequency picture signal component and an output being coupled to an input of said switching signal generator, the time-division multiplex circuit being rendered inoperative when a maximum modulation depth is measured and a short-circuit switch arranged between input terminal and output terminal being rendered operative.

4. A picture signal processing circuit as claimed in claim 1, further comprising a circuit for measuring modulation depth, an input of said measuring circuit being coupled to the second output of the filter circuit for supplying the high-frequency picture signal component and an output being coupled to an input of said switching signal generator, the time-division multiplex circuit being rendered inoperative when a maximum modulation depth is measured and a short-circuit switch arranged between input terminal and output terminal being rendered operative.

5. A picture signal processing circuit as claimed in claim 1 wherein a first amplifier circuit is disposed between said first output of said filter circuit and said first input of said time-division multiplex circuit, a second amplifier circuit is disposed between said first output of said filter circuit and a second input of said time-division multiplex circuit, and a third amplifier circuit is disposed between said second output of said filter circuit and said second input of said time-division multiplex circuit.

6. A picture signal processing circuit as claimed in claim 5 wherein the first, second and third amplifier circuits have adjustable gain factors.

7. A picture signal processing circuit as claimed in claim 6 further comprising a circuit for measuring modulation depth, an input of said measuring circuit being coupled to the second output of the filter circuit for supplying the high-frequency picture signal component and an output being coupled to an input of said switching signal generator, the time-division multiplex circuit being rendered inoperative when a maximum modulation depth is measured and a short-circuit switch arranged between input terminal and output terminal being rendered operative.

* * * * *